(No Model.)

3 Sheets—Sheet 1.

G. B. THAYER.
REGISTER FOR STREET RAILWAY CARS.

No. 310,921. Patented Jan. 20, 1885.

Witnesses.
Arthur Tipperton.
John F. C. Prinkert

Inventor.
George B. Thayer,
by Crosby Gregory attys.

(No Model.) 3 Sheets—Sheet 2.

G. B. THAYER.
REGISTER FOR STREET RAILWAY CARS.

No. 310,921. Patented Jan. 20, 1885.

Witnesses.
Arthur Zipperlen.
John P. C. Prinslert.

Inventor.
George B. Thayer.
by Crosby & Gregory atty's.

(No Model.) 3 Sheets—Sheet 3.
G. B. THAYER.
REGISTER FOR STREET RAILWAY CARS.
No. 310,921. Patented Jan. 20, 1885.
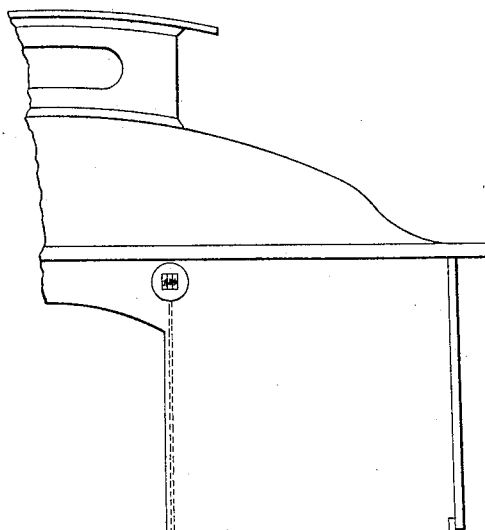
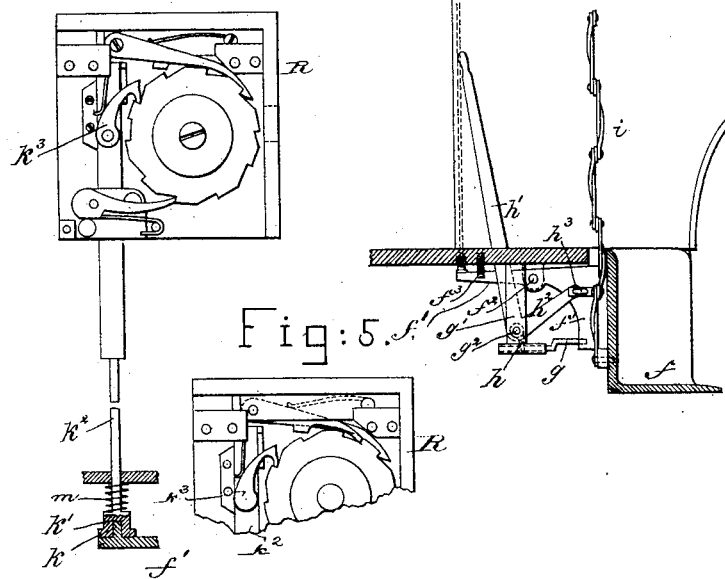
Witnesses.
Arthur Lippitten.
John F. E. Pinkert.
Inventor.
George B. Thayer.
by Crosby & Gregory
Attys

UNITED STATES PATENT OFFICE.

GEORGE B. THAYER, OF BOSTON, MASSACHUSETTS.

REGISTER FOR STREET-RAILWAY CARS.

SPECIFICATION forming part of Letters Patent No. 310,921, dated January 20, 1885.

Application filed February 27, 1884. (No model.)

*To all whom it may concern:*

Be it known that I, GEORGE B. THAYER, of Boston, county of Suffolk, State of Massachusetts, have invented an Improvement in Street-Railway Cars, of which the following description, in connection with the accompanying drawings, is a specification, like letters on the drawings representing like parts.

This invention in street-railway cars has for its object the construction of a car in which a registry of the number of passengers entering the car may be kept, and the register be automatically operated by the passengers as they severally enter the car.

The car herein shown has but one entrance-platform and one brake-crank, and the car-body is adapted to be swung or rotated upon a central pivot or journal upon reaching the end of the route, the horses being always harnessed to one or the front end of the car.

My invention consists of a street-railway car constructed and arranged substantially as hereinafter described, and particularly pointed out in the claim.

Figure 1:
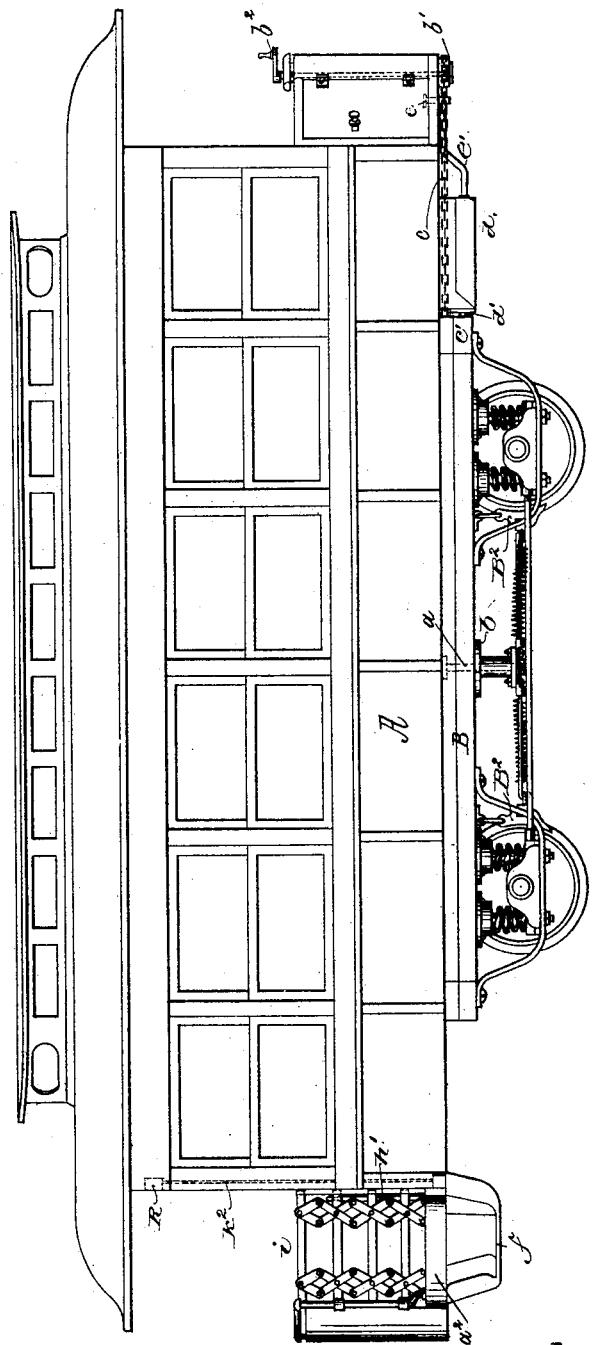
Figure 2:
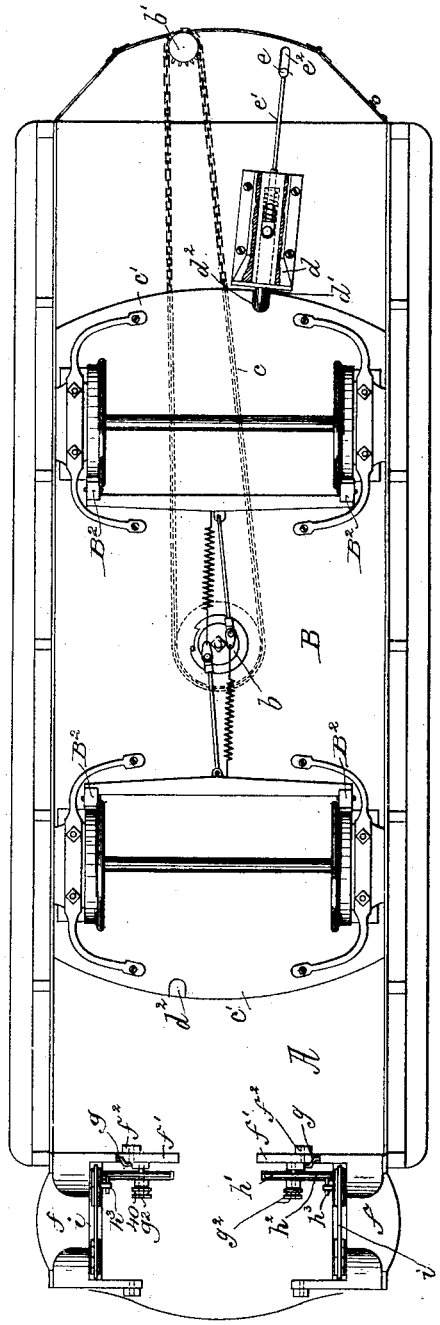

Figure 1 is a side elevation of a car containing my invention and showing the vertically-moving gate in elevated position; Fig. 2, a plan of the bottom of the car; Fig. 3, a broken or sectional elevation of one end of the car, to clearly show the gate-operating lever and other devices; Fig. 4, a detail of the register and its rod, and Fig. 5 a detail of the register.

The car-body A, of any suitable construction and design, rests upon and is centrally pivoted, as at $a$, Fig. 1, to the truck B, the said truck having wheels, which are acted upon by brakes $B^2$, of ordinary construction, the latter being, however, operated by a brake-pulley or sprocket-wheel, $b$, concentric with the pivot $a$ of the body A.

An endless brake-chain, $c$, engages the brake-pulley $b$ on the truck and a brake-wheel, $b'$, on the vertical brake-shaft provided with the crank $b^2$, the said shaft being arranged upon the driver's platform or end of the car, the same platform being occupied by the driver whatever may be the direction of movement of the car, for the car-body is made to rotate on the truck at the desired time.

A spring lock or catch, $d$, of suitable construction, is secured to the under side of the car-body, preferably at its forward end, and is so arranged that its spring-bolt $d'$ will engage the recesses $d^2$, one at each end of the truck, to lock the car-body to said truck when swung around end to end and in line therewith, the spring-bolt $d'$ moving over the contiguous curved end $c'$ of the truck when withdrawn from the recesses and the body moved as stated.

A push-knob, $e$, working in the slot $e^2$, in the floor of the front end of the car and connected by the rod $e'$ with the spring-bolt $d'$, enables the driver to withdraw the said spring-bolt from the contiguous recess $d^2$ to permit the car-body to be rotated on its central pivot, $a$, and reverse the position of said car-body with relation to its truck, which is done as, for instance, at the end of the route, when it is desired to make a return trip.

The construction of car just described forms no part of the present case, and is only shown and set forth in detail for the purpose of illustrating in a practical manner my invention herein claimed.

Both or either of the steps $f$ at the entrance-way to the rear or passenger-platform $a^2$ of the car-body A are pivoted through their levers $f'$, and thereby rendered capable of vertical movement with relation to the said platform. Each step has projecting from it a lever, $f'$, pivoted between its ends to the car-body at $f^2$, and having a spring, $f^3$, interposed between the free end of said lever and the car-body to hold the step in its elevated or normal position.

The step is locked in its elevated or normal position by means of the step-locking device shown as a slide-bolt, $g$, capable of movement in bearings in the supports $g'$, secured to the body A, and engaging a recess or slot in the lower part of the lever, as clearly indicated in Fig. 3.

The slide-bolt $g$ is withdrawn from the slot in the lever $f'$ by means of the finger $h$, (see Fig. 3,) engaging said slide-bolt $g$ and fixed to the pivot-shaft $g^2$ of the angle or hand lever $h'$, having its bearings in the support $g'$, the upper end of the said hand-lever being extended upward through the platform and terminating in a handle, which may be readily grasped and operated by the conductor or other person in charge of the car, while the arm $h^2$, attached to said pivot-shaft, engages a slotted plate, $h^3$, attached to the lower bar of the vertically-movable folding gate, made on the principle of lazy-tongs, and arranged across the entrance or passage-way of the platform contiguous to the pivoted or movable step. The entrance of persons upon the platform is prevented until the gate is moved to open the entrance-way.

The free end of the step-supporting lever $f'$ is provided with a stud, $k$, upon which is fitted a cup, $k'$, attached to the lower end of the rod $k^2$, whose upper end is connected with and operates the pawl $k^3$ of a suitable registering apparatus, R, (see details Figs. 3 and 4,) said pawl engaging a wheel having a suitable dial or indicator, as is common.

A coiled spring, $m$, encircles the rod $k^2$ between the under side of the platform and the cup $k'$ of the rod, to give the return movement of the rod, as will be presently seen.

The operation of the passenger-registering apparatus is as follows: When a person is about to board the car, the conductor moves the hand-lever $h$ to withdraw the slide-bolt $g$ from the lever $f'$, thereby unlocking the hinged step, and at the same time causing the gate to be folded below the top of the platform. As soon as the person about to enter the car throws his weight upon the step $f$ it is depressed or moved on its hinge or pivot $f^2$, thereby elevating the free end of the lever $f'$ and forcing the rod $k^2$ upward against the action of the coiled spring $m$, whereupon the spring-pawl $k^3$, pivoted to the upper end of the rod, will be carried over the face of the toothed wheel to engage a tooth; but as soon as the passenger moves from the step $f$ and enters the car the spring $f^3$, acting on the lever $f'$, elevates the step into its normal position, and the coiled spring $m$ forces the rod $k^2$ to follow the movement of the free end of the lever $f'$, thereby causing the pawl connected to said rod to move the toothed wheel a partial rotation, whereupon the conductor reverses the movement of the hand-lever $h$, and at the same time and by the said lever elevates the gate into position, when the step is again locked by means of the slide-bolt.

The other side of the platform may be provided with a similar apparatus for registering the number of passengers boarding the car.

The gate, since it operates the locking mechanism of the step, serves as a safeguard to the conductor against loss, since without it persons once admitted to the car might step down upon it and back again, registering one fare each time, for which the conductor must account; or, as often happens, persons might mount upon the step in order to make inquiries as to the proper car to take in order to reach their destination.

The shaft $g^2$, which operates the gate and slide or locking-bolt $g$, instead of being operated by the hand-lever $h$, may be operated from any part of the car by means of a cord or rope placed on a pulley, 40, thereon. As a safeguard against any tampering with the recording mechanism an alarm-bell or other audible signal apparatus or device should be attached to the register, as usual, so as to ring each time a fare is registered.

I claim—

The combination, substantially as shown and described, in a street-railway car, of a passenger-platform, the normally stationary step $f$, its lever-projections $f'$, the bolt $g$ for locking said step in its normal position, means to retract said bolt to release the step to permit it to move on its pivots, the gate $i$, operable by the means for locking and unlocking the step, a registering apparatus, and means between the step and the registering apparatus operated by the step to actuate the registering apparatus.

In testimony whereof I have signed my name to this specification in the presence of two subscribing witnesses.

GEORGE B. THAYER.

Witnesses:
 G. W. GREGORY,
 B. J. NOYES.